United States Patent [19]

Goto et al.

[11] Patent Number: 5,201,803
[45] Date of Patent: Apr. 13, 1993

[54] HYDRAULIC SYSTEM FOR A VEHICLE

[75] Inventors: Kunifumi Goto; Shigeru Suzuki; Tatsuyuki Hoshino, all of Kariya, Japan

[73] Assignee: Kabushiki Kaisha Toyoda Jidoshokki Seisakusho, Kariya, Japan

[21] Appl. No.: 787,056

[22] Filed: Nov. 4, 1991

[30] Foreign Application Priority Data

Nov. 6, 1990 [JP] Japan .................. 2-301874

[51] Int. Cl.⁵ .............................................. F16D 31/02
[52] U.S. Cl. ........................................ 60/422; 60/426; 60/452; 91/518
[58] Field of Search ................ 60/420, 422, 426, 427, 60/431, 433, 434, 445, 452, 484; 91/511, 512, 514, 518

[56] References Cited

U.S. PATENT DOCUMENTS

| | | | |
|---|---|---|---|
| 3,579,987 | 5/1971 | Busse | 60/422 X |
| 4,479,349 | 10/1984 | Westveer | 60/422 X |
| 4,823,551 | 4/1989 | Hehl | 60/422 |
| 4,870,819 | 10/1989 | Walzer | 60/422 |
| 4,938,023 | 7/1990 | Yoshino | 60/420 X |
| 4,966,066 | 10/1990 | Kauss et al. | 60/422 X |

FOREIGN PATENT DOCUMENTS 62-12427 1/1987 Japan .

Primary Examiner—Edward K. Look
Assistant Examiner—Hoang Nguyen
Attorney, Agent, or Firm—Brooks Haidt Haffner & Delahunty

[57] ABSTRACT

Disclosed is a hydraulic system for driving both an air conditioning compressor and a power steering mechanism. Pressured fluid discharged from a variable capacity pump is supplied to a hydraulic motor for driving the air conditioning compressor and to the power steering mechanism. A controller controls the discharging capacity of the variable capacity pump in accordance with loads on the hydraulic motor and the power steering mechanism.

10 Claims, 6 Drawing Sheets

HYDRAULIC SYSTEM FOR A VEHICLE

BACKGROUND OF THE INVENTION

1. Field of the Invention

The present invention relates to a hydraulic system for a vehicle, and more particularly, to a hydraulic system for driving both an air conditioning compressor and a power steering mechanism.

2. Description of the Related Art

Some vehicles with the power steering mechanisms are designed so that the hydraulic system that drives the power steering mechanisms also drives the vehicle's air conditioning compressor. This arrangement simplifies the internal structures of the vehicle's hydraulic system and requires less energy to operate.

A hydraulic system of this type is disclosed in Japanese Unexamined Patent Publication No. 62-12427. In this system, as shown in FIG. 7, a hydraulic motor 101 for driving an air conditioning compressor 100 is connected to a hydraulic pump 103. A power steering mechanism 102 is also connected to the hydraulic pump 103 in parallel with the hydraulic motor 101.

The hydraulic pump 103 is driven by an engine and is connected to two (first and second) branched fluid by-passes 104 and 105. A variable flow rate control valve 106 and a relief valve 107 are located in the first and second fluid bypasses 104 and 105 respectively. A controller 108 controls the opening and closing of the flow control valve 106 based on a signal which reflects various driving loads in the air conditioning system.

In the above-described structure, the pressure downstream of the relief valve 107 becomes low when the power steering mechanism 102 is not activated. The relief valve 107 blocks the second fluid bypass 105, and the pressurized fluid flows to the first fluid bypass 104.

When the power steering mechanism 102 is activated and the internal pressure of the pipe positioned downstream of the relief valve 107 rises, the valve 107 opens. As a result, the pressurized fluid from the hydraulic pump 103 will be supplied toward the power steering mechanism 102 without flowing through the first fluid bypass 104.

This hydraulic system developed on the premise that the power steering mechanism works only when the steering wheel is operated while the vehicle is running slowly or is stopped. If the power steering mechanism 102 is activated only under the above limited conditions, therefore, a change in the operational state of air conditioning system is allowable. However, when the power steering mechanism 102 and the compressor 100 are driven at the same time, the following shortcoming would occur.

The power steering mechanism 102 requires much less pressurized fluid for its operation than the capacity of the hydraulic pump 103. If the amount of pressurized fluid discharged from the hydraulic pump 103 is conformed to the specifications of the power steering mechanism 102, an insufficient amount of pressurized fluid will be available to the hydraulic motor 101. The capacity of the hydraulic motor 101 may be reduced to raise the rotational speed of the compressor 100. However, this measure will result in insufficient power of the compressor 100.

On the other hand, if the amount of fluid from the hydraulic pump 103 is conformed to the rating of the hydraulic motor 101, an excessive amount of fluid will be discharge to the power steering mechanism 102 when the compressor 100 is not working, thereby causing a significant energy loss.

SUMMARY OF THE INVENTION

It is therefore an object of the present invention to provide a hydraulic system for a vehicle, which can adjust the amount of pressurized fluid that is supplied at any given time in accordance with the loads of air conditioning system and a power steering system.

It is another object of the present invention to provide a hydraulic system for a vehicle, which supplies power enough to drive an air conditioning system, and prevents occurrence of the energy loss when a power steering mechanism is activated.

To achieve the foregoing and other objects and in accordance with the purpose of the present invention, an improved hydraulic system for a vehicle is provided. The hydraulic system includes a power steering mechanism and a hydraulic motor that drives the compressor for an air conditioner. A variable capacity pump for supplies pressurized fluid to the hydraulic motor and the power steering mechanism. A controller controls the discharge capacity of the variable capacity pump in accordance with respective loads on the hydraulic motor and the power steering mechanism.

In a preferred embodiment, the variable capacity pump has a swash plate that tilts to vary the discharge capacity of the pump. The control means includes a direction switching valve and a hydraulic cylinder coupled to the swash plate of the variable capacity pump. The valve may be switched between a first switch position that supplies pressurized fluid to the hydraulic cylinder to move the hydraulic cylinders to a first cylinder position when the power steering mechanism is operated alone. The switch is then moved to a second position for discharging the pressurized fluid from the hydraulic cylinder to move the hydraulic cylinder to a second cylinder position when the compressor is operated alone and when both the power steering mechanism and the compressor are operated.

DETAILED DESCRIPTION OF THE PREFERRED EMBODIMENT

Figure 1:
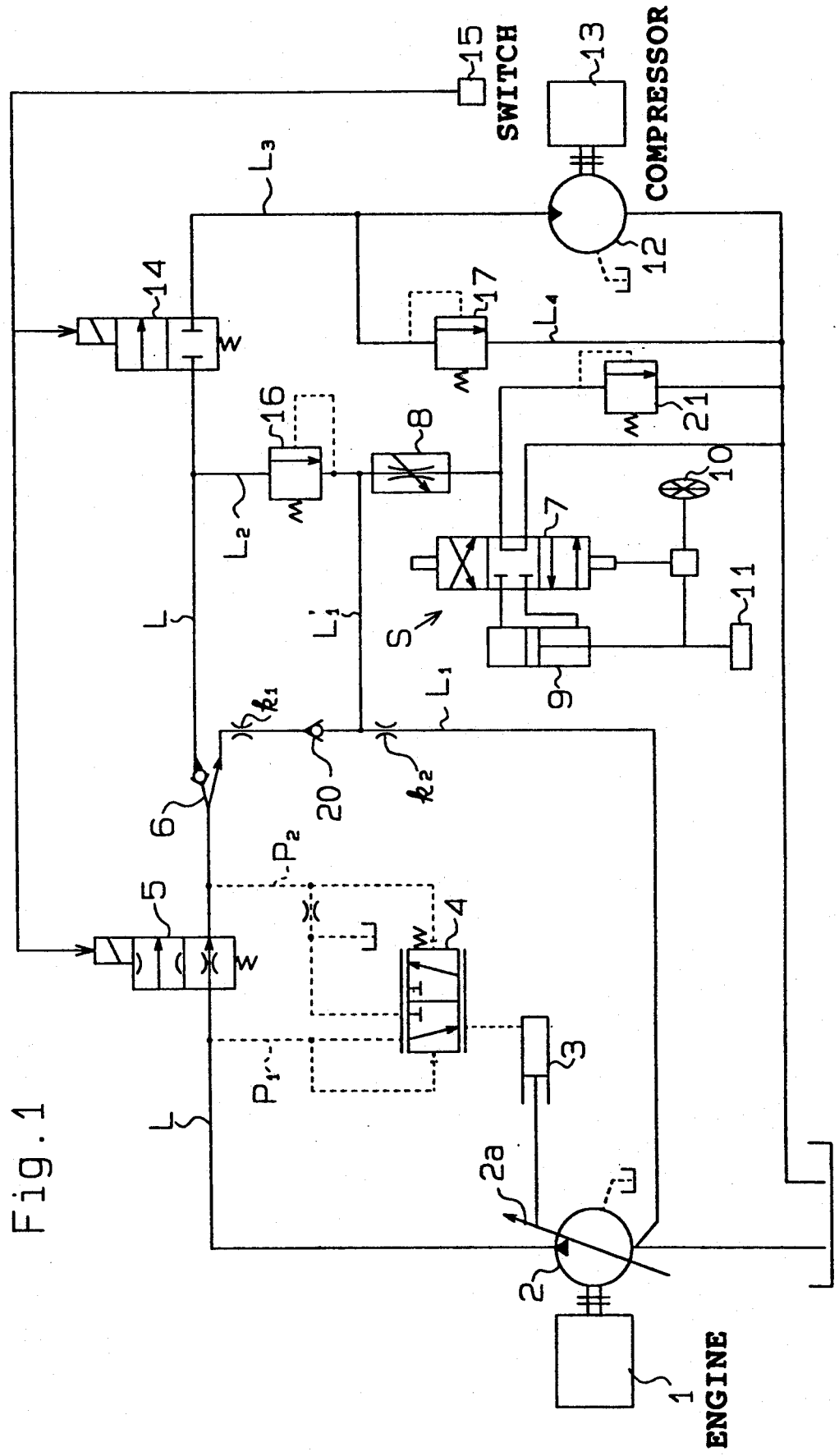
FIG. 1 is a hydraulic circuit diagram illustrating a hydraulic system according to the present invention when neither a power steering mechanism nor an air conditioning system is activated.

A preferred embodiment of the present invention will now be described referring to FIGS. 1 to 6. The engine 1 of a vehicle includes a variable capacity swash-plate type hydraulic pump 2. A cylinder 3 for adjusting the capacity is coupled to a swash plate 2a of the hydraulic pump 2. The cylinder 3 is moved forward and backward by the fluid flowing in and out by the switching operation of a direction switching valve 4 to be described later.

Figure 2:
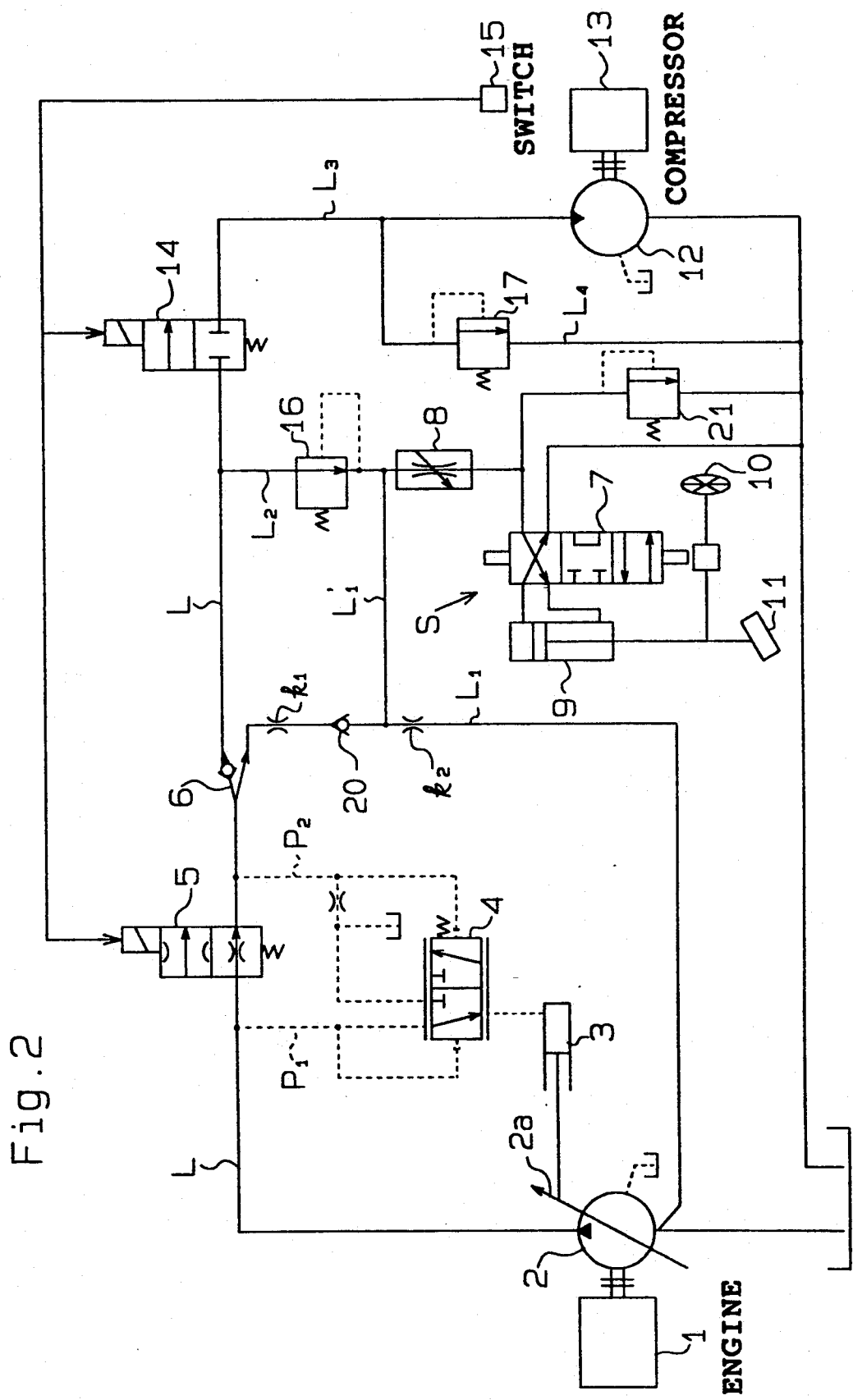
FIG. 2 is a hydraulic circuit illustrating the condition that occurs when the power steering mechanism in action.

A solenoid pressure control valve 5 is placed in a main fluid path L, and the direction switching valve 4 is connected via pilot fluid paths p1 and p2 respectively to the upstream side and downstream side of the pressure control valve 5. The pressure control valve 5 is switched between a constricted position as shown in FIG. 1 and a release (open) position as shown in FIG. 2 based on the switching operation of an instruction switch 15.

In the constricted position the pressure control valve 5 allows only a small amount of fluid to pass therethrough. This increases the pressure difference $\Delta p$ between the upstream and downstream sides of the pressure control valve 5. The direction switching valve 4 is therefore set at a fluid-inflow position as shown in FIGS. 1 and 2 by the pilot pressure that is applied via the pilot fluid paths p1 and p2. Thus, pressurized fluid pushes the cylinder 3 forward to keep the tilting angle of the swash plate 2a small so as to minimize the discharge capacity of the hydraulic pump 2.

Figure 3:
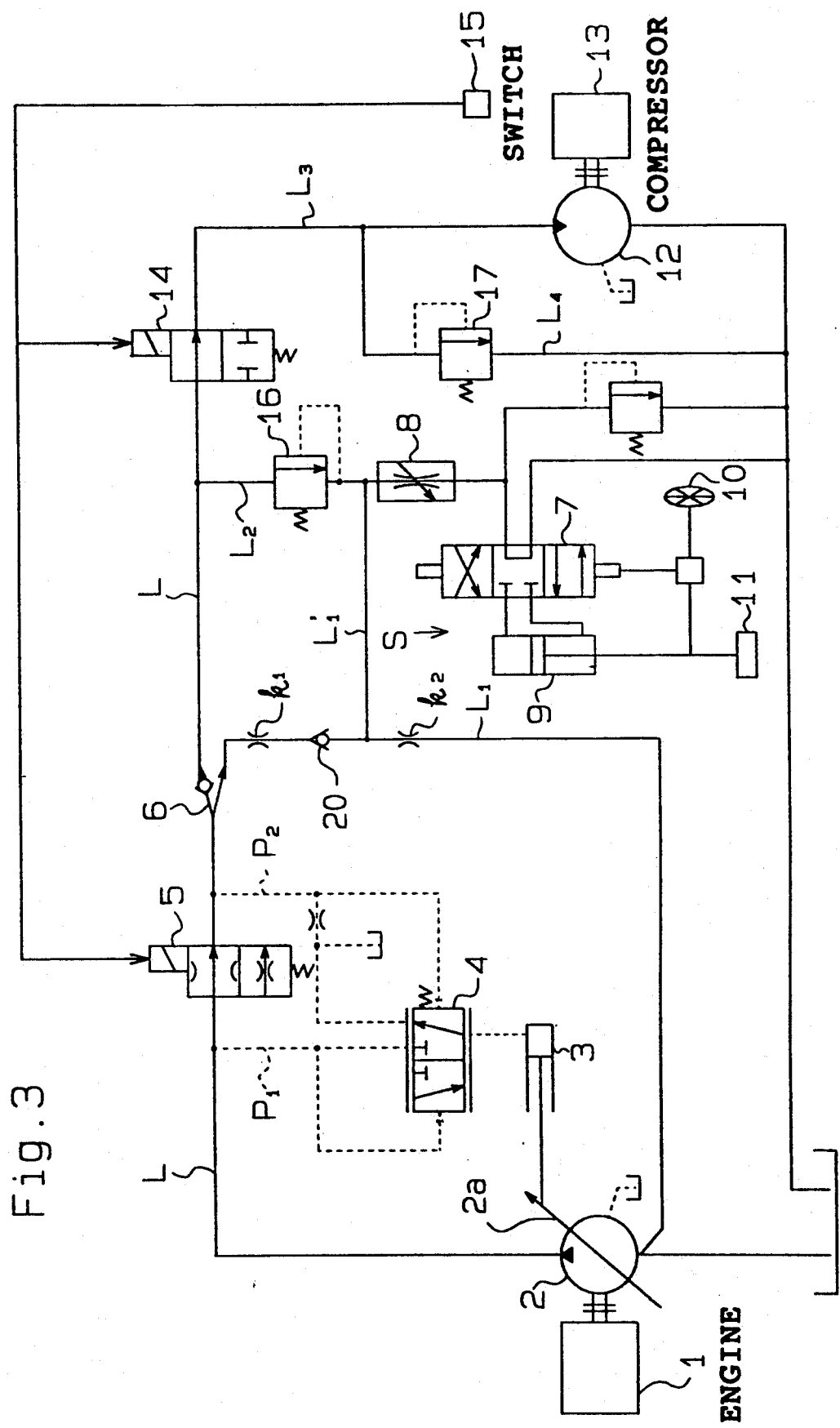
FIG. 3 is a circuit diagram illustrating the condition that occurs when an air conditioning system is operating.
Figure 4:
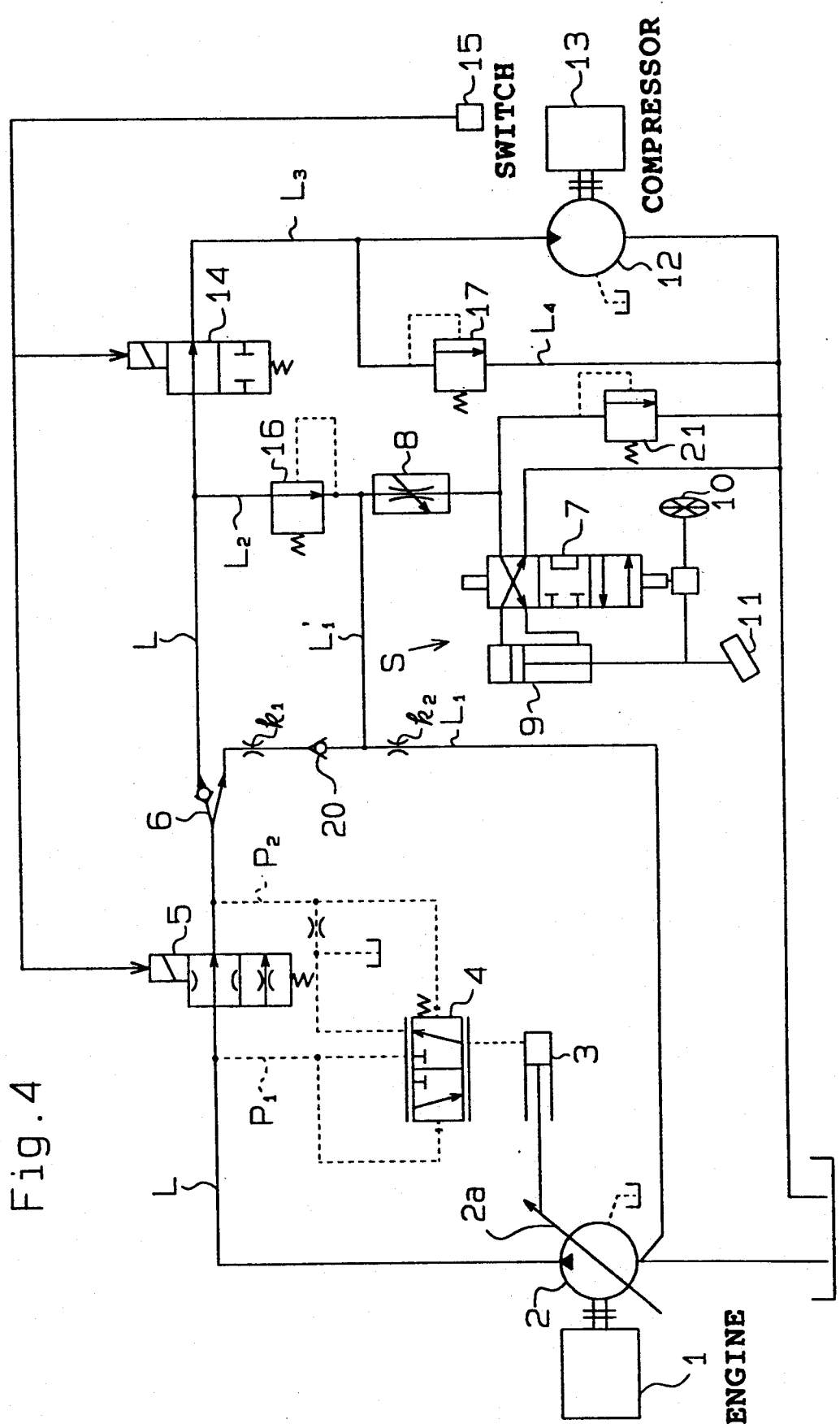
FIG. 4 is a circuit diagram illustrating the state of the hydraulic system when both the power steering mechanism and the air conditioning system are operating.

At the release position the pressure control valve 5 allows a relatively large amount of fluid to pass therethrough. This decreases the pressure differential $\Delta p$ between the upstream and downstream sides of the valve 5. The direction switching valve 4 is therefore positioned at a fluid-outflow position as shown in FIGS. 3 and 4. The cylinder 3 thus moves backward as the pressurized fluid flows out from the cylinder 3. Accordingly, the tilt angle of the swash plate 2a becomes large which maximizes the discharge capacity of the hydraulic pump 2.

If rotational speed of the engine exceeds a predetermined value for each switched position of the pressure control valve 5, the amount of the fluid discharged from the hydraulic pump 2 becomes constant.

A check valve 6 is provided downstream of the pressure control valve 5 in the main fluid path L. A short fluid path L1 is connected to the main fluid path L just upstream of check valve 6. A constriction is disposed in the fluid path L1 just downstream of its junction with the main fluid path L. A check valve 20 is located downstream of the constriction k1. A path L1' for producing the relief pressure in a relief valve 16 to be described later joins path L1 downstream of the check valve 20. A constriction k2 is provided in the short fluid path L1 downstream of the junction with fluid path L1' so that the pressurized fluid will flow in the fluid path L1' by priority, First and second operation fluid paths L2 and L3 branch from the main fluid path L, downstream of the crack valve 6. The first operation fluid path L2 includes a relief valve 16, a flow controller 8, and a control valve 7 which is a part of a power steering mechanism S. Downstream from the flow controller 8, a fluid path branching from the power steering mechanism side leads via a relief valve 21 to an oil tank T.

The relief valve 16 is opened and closed by the fluid pressure on the downstream side of the valve 16. A power cylinder 9 is connected to the control valve 7. Based on the amount of manipulation of a steering wheel 10, the position of the control valve 7 is selected to change the connecting conditions to the power cylinder 9. The power cylinder 9 is thrust forward and backward by the ensuing inflow and outflow of the pressurized fluid. The cylinder rod of the power cylinder 9 is coupled to an operation wheel 11 to control the steering angle of the wheel 11 as the power cylinder 9 is thrust forward or backward.

A hydraulic motor 12 is placed in the second operation fluid path L3 so that an air conditioning compressor 13 is driven by the hydraulic motor 12. A solenoid valve 14 is provided upstream of the hydraulic motor 12. The valve 14 as well as the pressure control valve 5 are excited by rendering the instruction switch 15 on.

A relief valve 17 is located in a fluid bypass L4 which is connected to the second operation fluid path L3 at a position between the valve 14 and the hydraulic motor 12. The relief valve 17 permits the fluid bypass L4 to communicate with the path L3 when the fluid pressure upstream of the valve 17 reaches a predetermined value. The relief valve 17 therefore serves as a safety valve when the hydraulic motor 12 and the compressor 13 are locked.

In the conditions shown in FIG. 1, the compressor 13 and the power steering mechanism S are inactive. In other words, the valve 14 is closed, the hydraulic motor 12 is not activated, and the pressure control valve 5 is at the constricted position, setting the capacity of the hydraulic pump 2 to a minimum. Further, since the control valve 7 is in a neutral position and the fluid pressure at the downstream side of the relief valve 16 is low. The relief valve 16 blocks the first operation fluid path L2. Further, the valve 14 and the relief valve 17 are both closed. Most of the fluid fed from the pump 2 therefore flows into the short fluid path L1 and the fluid path L1'.

Figure 5:
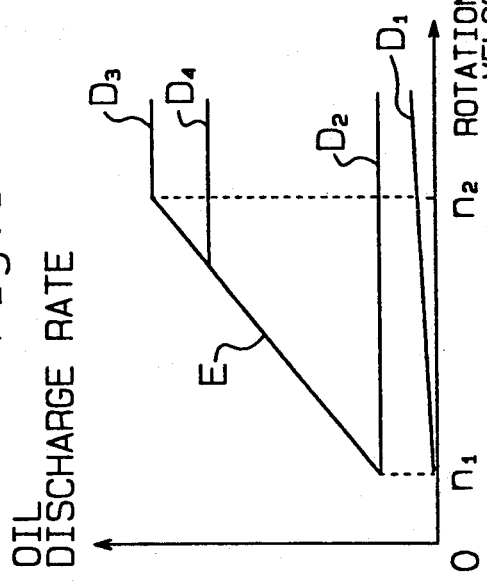
FIG. 5 is a graph showing the relationship between the rotational speed of the engine and the amount of fluid discharged from a hydraulic pump.

FIG. 5 shows the relationship between the rotation speed of the engine 1 and the amount of the fluid discharged to the main fluid path L. Line D1 indicates the status of the hydraulic system as shown in FIG. 1. Regardless of the speed of the engine 1, the pump 2 scarcely sends out the fluid.

FIG. 2 shows the condition where the steering wheel 10 is operated to activate the power steering mechanism S. The relief valve 16 is opened by the pressure increase in the downstream pipe, unblocking the first operation fluid path L2. Accordingly, the pressurized fluid flows mainly through the main fluid path L rather than the short fluid path L1 which has the constrictions k1 and k2.

Since the fluid supply to the first operation fluid path L2 becomes possible, the pressure difference $\Delta p$ between the upstream and downstream sides of the pressure control valve 5 drops. This increases the discharging capacity of the hydraulic pump 2 accordingly, and the increased amount of fluid is supplied from the pump 2 to the first operation fluid path L2 to activate the power steering mechanism S. A line D2 in FIG. 5 corresponds to the status of the hydraulic system shown in FIG. 2. Irrespective of an increase or decrease in the engine speed, the discharging capacity of the hydraulic pump 2 maintained almost steady due to the capacity control action of the direction switching valve 4.

FIG. 3 illustrates the condition in which the instruction switch 15 is on, the compressor 13 is activated, and the power steering mechanism S is inactive. When the instruction switch 15 is on, the pressure control valve 5 and the valve 14 are activated, the valve 5 is shifted to the constricted position, and the valve 14 is open. The pressurized fluid is mainly flowing through the main fluid path L. The pressure differential Δp between the upstream and downstream sides of the pressure control valve 5 is significantly reduced. This maximizes the discharging capacity of the hydraulic pump 2. The pump 2 therefore supplies the maximum amount of the pressurized fluid to the second operation fluid path L3, so that the hydraulic motor 12 can drive the compressor 13.

Line E in FIG. 5 shows the amount of fluid discharged from the pump 2 as a function of variations in the rotation speed of the engine 1 when the compressor 13 is driven. When the rotation speed of the engine 1 is between an idling speed n1 and a slow speed n2, the amount of fluid is approximately proportional to the engine speed. When the engine speed is above the speed n2, the discharged amount of fluid is approximately constant as indicated by a line D3. This is accomplished through control of the direction switching valve 4.

FIG. 4 illustrates a state where both the power steering mechanism S and the compressor 13 are operating. In this condition, the swash plate 2a of the hydraulic pump 2 is set on the large capacity side as in FIG. 3. The amount of fluid supplied from the hydraulic pump 2 is indicated by the lines E and D3 in FIG. 5. Compared with the case shown in FIG. 3, the amount of fluid that flows in the second operation fluid path L3 is decreased by the amount to be supplied to the first operation fluid path L2. The amount of fluid to be supplied to the second operation fluid path L3 is indicated by a line D4. Since the operation period of driving the power steering mechanism S is normally short, however, the reduction in the fluid supply to the second operation fluid path L3 will not affect the operation of the air conditioner.

In the hydraulic system according to this embodiment, if neither the power steering mechanism S nor the air conditioning system is operating, most of the pressurized fluid discharged from the hydraulic pump 2 circulates in the short fluid path L1. The circulating amount of fluid is much less than the discharged amount of fluid when the power steering mechanism S or the air conditioning system is driven. When the power steering mechanism S and the air conditioning system are not working, the engine load to supply the pressurized fluid is very low, thus minimizing the energy consumption.

During the operation of the power steering mechanism S or the air conditioning system, the amount of fluid discharged from the pump 2 does not exceed the required volume, even though the engine speed increases. Thus, when compared with the prior art, it is possible to decrease the amount of the fluid required to drive the power steering mechanism S and the air conditioning system, resulting in significant energy saving.

Since the described system delivers only the amount of fluid required by the power steering mechanism S and/or the air conditioning system, the hydraulic pump 2 does not need to deliver an excessively large capacity. Thus, a smaller capacity pump may be used. Further, a smaller capacity hydraulic motor 12 can be used as well.

Figure 6:
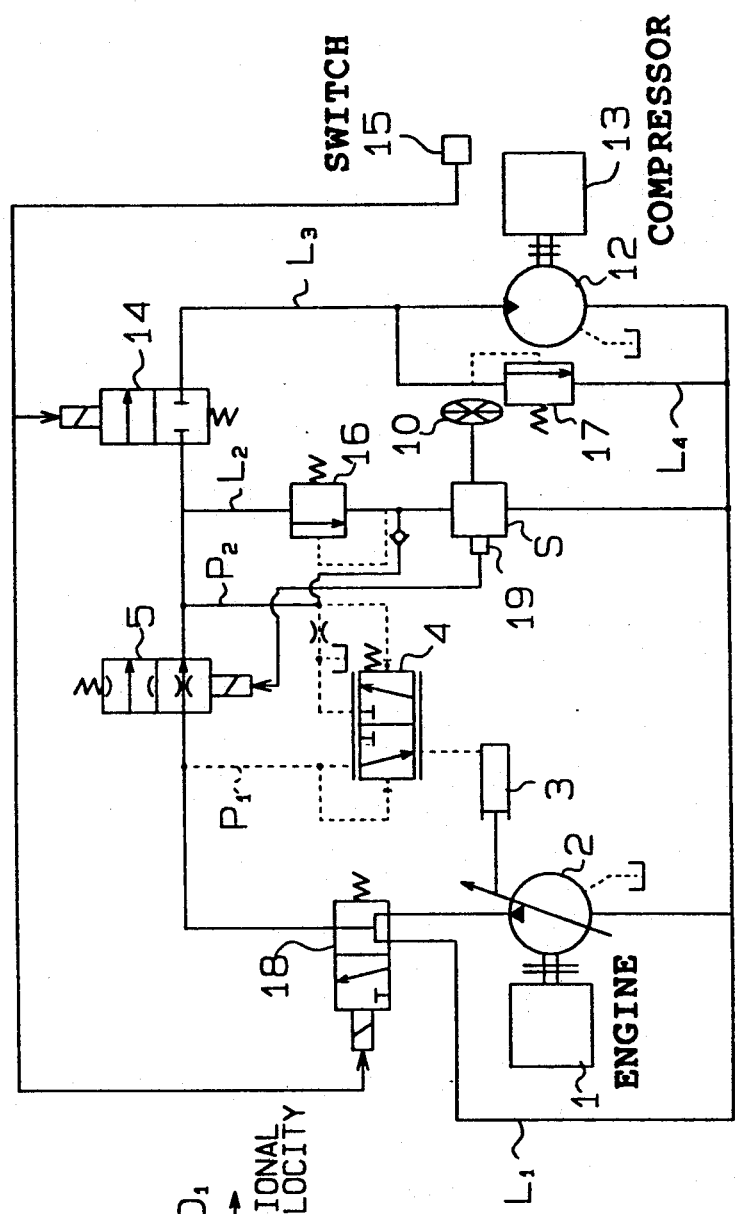
FIG. 6 is a hydraulic circuit diagram illustrating a modification of the hydraulic system of the present invention.
Figure 7:
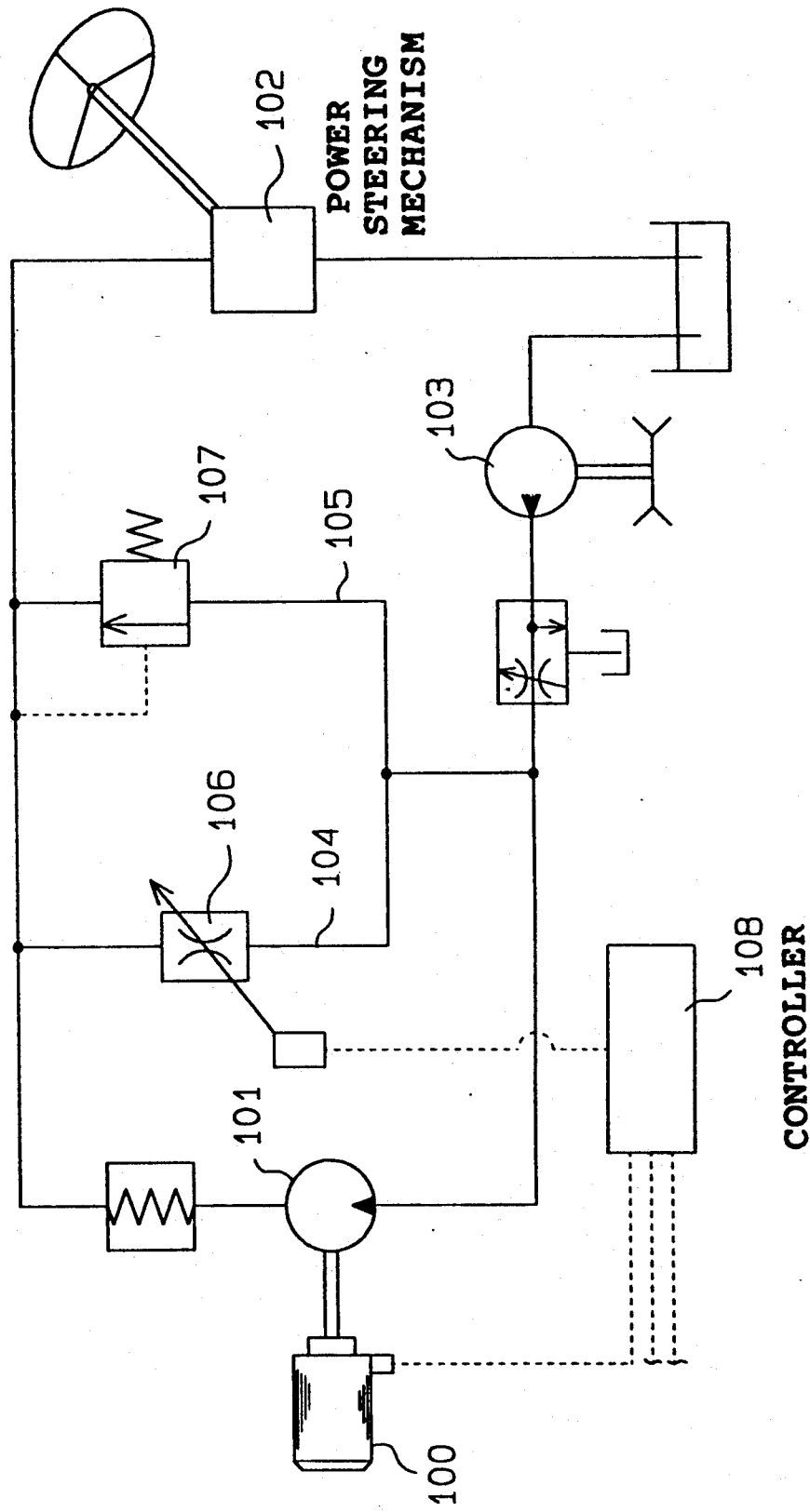
FIG. 7 is a hydraulic circuit diagram showing a conventional hydraulic system.

The present invention is not limited to the above-described embodiment, but may be applied to another hydraulic systems as well. By way of example, one alternative configuration is shown in FIG. 6. In this system, the main fluid path L or the short fluid path L1 selectively communicates with the hydraulic pump 2 by means of a solenoid direction switching valve 18. A controller C then switches the pressure control valve 5, based on a pressure signal sent from a pressure sensor 19 which is incorporated in the power steering mechanism S. With this structure, the necessary amount of fluid to drive the power steering mechanism S and/or the air conditioning system will be supplied as required.

Further, the relief valve 16 may be replaced with a solenoid switching valve which is opened or closed according to the signal from the pressure sensor 19.

What is claimed is:
1. A hydraulic system for a vehicle comprising:
   a hydraulic motor for driving an air conditioning compressor;
   a power steering mechanism;
   a variable capacity pump for supplying pressurized fluid to the hydraulic motor and the power steering mechanism;
   a control means for controlling the discharge capacity of the variable capacity pump in accordance with loads on the hydraulic motor and the upper steering mechanism;
   said variable capacity pump having a swash plate, and the discharge capacity of the pump being arranged to change in accordance with a tilt angle of the swash plate;
   said control means including a hydraulic cylinder coupled to the swash plate, and a direction switching valve coupled to said hydraulic cylinder and having a first position for supplying said pressurized fluid to said hydraulic cylinder to move said hydraulic cylinder forward when said power steering mechanism is operated alone, and a second position for discharging said pressurized fluid said hydraulic cylinder to move said hydraulic cylinder backward when said compressor is operating alone and when both said power steering mechanism and said compressor are operating simultaneously, said direction switching valve adjusting the fluid flow amount supplied to and discharged from said hydraulic cylinder;
   said control means including a pressure control valve for controlling a fluid pressure of fluid discharged from the variable capacity pump, the pressure control valve having a constricted position and an open position, an instruction switch for directing the activation and deactivation of the compressor, the instruction switch being coupled to the pressure control valve for switching the pressure control valve between the constricted and open positions and a pilot fluid path, connected between the direction switching valve and a position downstream of the pressure control valve, for controlling the position of the direction switching valve based on the position of the pressure control valve.

2. A hydraulic system according to claim 1, wherein the power steering mechanism comprises:
   a first control valve whose position is switched in accordance with an operation of a steering wheel; and
   a steering cylinder coupled to an operation wheel, the steering cylinder being arranged to provide power steering control to the operation wheel based on the position of the first control valve.

3. A hydraulic system according to claims 2, further comprising a second control valve, provided in a fluid path between the hydraulic motor and the variable capacity pump, for blocking and unblocking the fluid path based on ON and OFF operations of the instruction switch.

4. A hydraulic system according to claim 3, further comprising a bypass for allowing the pressurized fluid to bypass the hydraulic motor when the hydraulic motor is locked, and a relief valve provided in the bypass for opening the bypass when the pressure in the bypass exceeds a predetermined pressure.

5. A hydraulic system for a vehicle comprising:
- a hydraulic motor for driving an air conditioning compressor;
- a power steering mechanism;
- a variable capacity pump for supplying pressurized fluid to the hydraulic motor and the power steering mechanism, the variable capacity pump including a swash plate arranged such that the discharging capacity of the variable capacity pump varies in accordance with the tilting angle of a swash plate;
- a hydraulic cylinder coupled to said swash plate of the variable capacity pump;
- a direction switching valve coupled to said hydraulic cylinder and having a first switch position for supplying said pressurized fluid to said hydraulic cylinder to move said hydraulic cylinder to a first cylinder position when said power steering mechanism is operating alone, and a second switch position for discharging said pressurized fluid from said hydraulic cylinder to move said hydraulic cylinder to a second cylinder position when said compressor is operating alone and when both said power steering mechanism and said compressor are operating simultaneously;
- a pressure control valve for controlling the fluid pressure of fluid discharged from said variable capacity pump, said pressure control valve having a constricted position and an open position;
- an instruction switch for directing the activation and deactivation of said compressor, said instruction switch being coupled to said pressure control valve for switching said pressure control valve between said constricted and open positions; and
- a pilot fluid path, connected between said direction switching valve and a position downstream of said pressure control valve, for controlling the position of said direction switching valves as a function of the position of said pressure control valve, based on the fluid pressure downstream of said pressure control valve, whereby said direction switching valve adjusts the fluid flow amount supplied to and discharged from said hydraulic cylinder.

6. A hydraulic system according to claim 5, wherein the power steering mechanism comprises:
- a first control valve whose position is switched in accordance with an operation of a steering wheel; and
- a steering cylinder coupled to an operation wheel, the steering cylinder being arranged to provide power steering control to the operation wheel based on the position of the first control valve.

7. A hydraulic system according to claim 6, further comprising a second control valve, provided in a fluid path between the hydraulic motor and the variable capacity pump, for blocking and unblocking the fluid path based on ON and OFF operations of the instruction switch.

8. A hydraulic system according to claim 7, further comprising a bypass for allowing the pressurized fluid to bypass the hydraulic motor when the hydraulic motor is locked, and a relief valve provided in the bypass for opening the bypass when the pressure in the bypass exceeds a predetermined pressure.

9. A hydraulic system for a vehicle comprising:
- a hydraulic motor for driving an air conditioning compressor;
- a power steering mechanism including a power-steering control valve whose position is switched in accordance with an operation of a steering wheel, and a steering cylinder coupled to an operation wheel, the steering cylinder being arranged to provide power steering control to the operation wheel based on the position of the first control valve;
- a variable capacity pump for supplying pressurized fluid to the hydraulic motor and the power steering mechanism, the variable capacity pump including a swash plate arranged such that a discharging capacity of the variable capacity pump varies in accordance with a tilting angle of a swash plate;
- a hydraulic cylinder coupled to the swash plate of the variable capacity pump;
- a direction switching valve to be switched between a first switch position for supplying the pressurized fluid to the hydraulic cylinder to move the hydraulic cylinder to a first cylinder position when the power steering mechanism is operated alone, and a second switch position for discharging the pressurized fluid from the hydraulic cylinder to move the hydraulic cylinder to a second cylinder position when the compressor is operated alone and when both the power steering mechanism and the compressor are operated;
- a pressure control valve for controlling a fluid pressure of fluid discharged from the variable capacity pump, the pressure control valve having a constricted position and an open position;
- an instruction switch for directing the activation and deactivation of the compressor, the instruction switch being coupled to the pressure control valve for switching the pressure control valve between the constricted and open positions; and
- a pilot fluid path, connected between the direction switching valve and a position downstream of the pressure control valve, for controlling the position of the direction switching valve based on the fluid pressure downstream of the pressure control valve, which is a function of the position of the pressure control valve.

10. A hydraulic system according to claim 9, further comprising a second control valve, provided in a fluid path between the hydraulic motor and the variable capacity pump, for blocking and unblocking the fluid path based on ON and OFF operations of the instruction switch.

* * * * *

UNITED STATES PATENT AND TRADEMARK OFFICE
CERTIFICATE OF CORRECTION

PATENT NO. : 5,201,803
DATED : April 13, 1993
INVENTOR(S) : K. Goto et al

It is certified that error appears in the above-indentified patent and that said Letters Patent is hereby corrected as shown below:

Column 1, line 49, before "air" insert --the--; line 68 "discharge" should read --discharged--.

Column 2, line 8, before "air" insert --an--; line 36, "cylinders" should read --cylinder--; line 51, after "circuit" insert --diagram--; line 52, after "when", delete "the", insert --a--.

Column 3, line 63, delete "crack" insert --check--.

Column 7, line 47, "valves" should read --valve--.
Column 2, line 8, delete "of" and insert --on--.

Signed and Sealed this

Twenty-ninth Day of March, 1994

*Attest:*

BRUCE LEHMAN

*Attesting Officer*   Commissioner of Patents and Trademarks